June 2, 1925.
J. A. SCHANNO
1,540,289
EQUALIZER
Filed Nov. 22, 1921
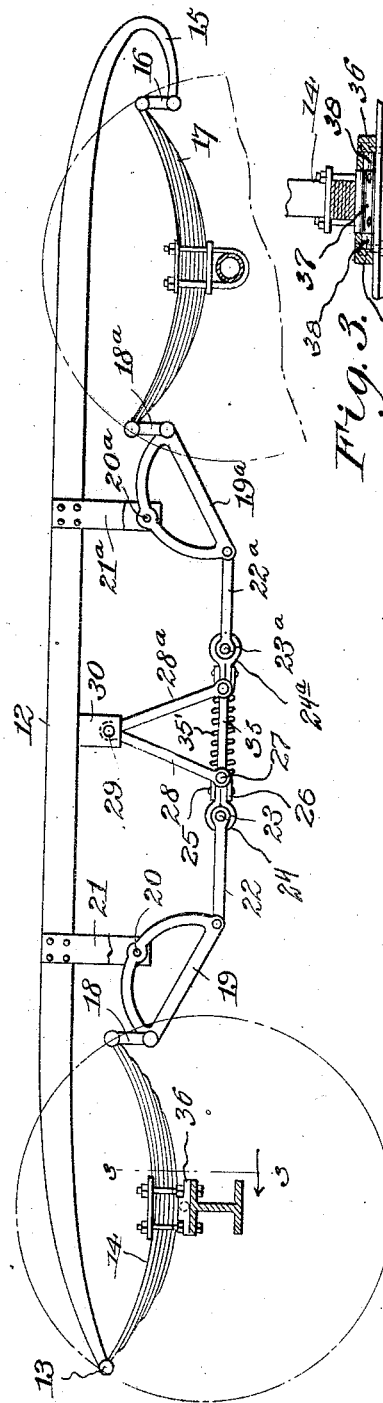
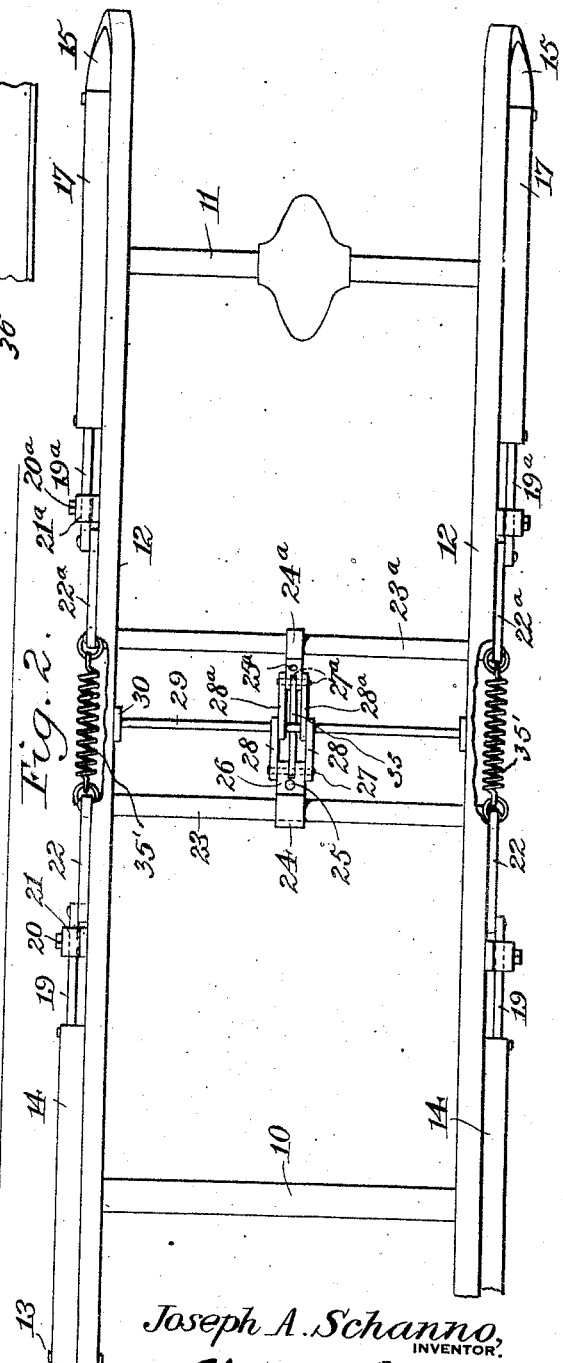
Joseph A. Schanno,
INVENTOR.
BY Victor J. Evans
ATTORNEY Patented June 2, 1925.

1,540,289

UNITED STATES PATENT OFFICE.

JOSEPH A. SCHANNO, OF BROOKLYN, NEW YORK.

EQUALIZER.

Application filed November 22, 1921. Serial No. 516,964.

*To all whom it may concern:*

Be it known that I, JOSEPH A. SCHANNO, a citizen of the United States, residing at Brooklyn, in the county of Kings and State of New York, have invented new and useful Improvements in Equalizers, of which the following is a specification.

This invention relates to equalizers and particularly to devices of this nature for equalizing the load and strains on springs of vehicles such as automobiles.

One of the objects is to produce a device of this nature in which no matter where the load is actually placed, it will be distributed among all of the springs.

Another object is to produce a device of this nature wherein if one of the wheels is subjected to a sudden shock as by a stone or rut, this shock will be divided among all of the springs and not confined to the single spring most closely connected to the particular wheel.

Another object is to produce a device of this nature which shall be simple of construction, cheap to manufacture, and highly efficient for the purpose for which it is designed.

With these and other objects in view, the invention resides in certain novel features of construction and combination and arrangements of parts, the essential features of which are hereinafter fully described, are particularly pointed out in the appended claims, and are illustrated in the accompanying drawing, in which:—

Figure 1 is a side elevation of an automobile chassis provided with my improvement.

Figure 2 is a plan view of the same.

Figure 3 is a detail sectional view of the front spring mounting, taken on line 3—3 of Figure 1.

Like characters of reference refer to like parts in all views.

Referring to the drawing in detail, 10 and 11 represent the front and rear axles and 12 represents the side members of the chassis frame. The members 12 are curved downwardly at their front ends and connected by bolts 13 or any other suitable means with the front springs 14. The springs 14 are offset from the chassis members 12 to as to permit the maximum relative movement between the axles and the chassis frame. The rear end of each member 12 is itself offset at 15 and returns on itself a short distance and is then connected by a spring shackle 16 with the rear spring 17. The rear end of the front spring 14 is connected by a spring shackle 18 to a bell crank 19 pivoted at 20 to a depending portion 21 of the frame 12. Member 19 is also freely connected to a link 22 which link is connected at its rear end to a cross rod 23. The cross rod 23 is provided at its center with a shackle 24 pivotally connected at 25 to a shackle 26 mounted on a wrist pin 27. Secured on pin 27 on opposite sides of shackle 26 are arms 28 which extend diagonally up and are secured to a rod 29 pivoted in depending members 30 which are attached to the frame members 12.

Similar connections $10^a$, $19^a$, $20^a$, $21^a$, $22^a$, $24^a$, $25^a$, $26^a$, $27^a$ and $28^a$ connect the front end of the rear springs 17 to the cross bar 29. A link 35 connects the depending ends of members 28 and $28^a$.

It will be seen that the bars 23 and $23^a$ go completely across the chassis frame and that upon movement of any one of the wheels and its corresponding spring either in an upward or downward direction, the strain will immediately be transferred to the wheel on the opposite side, the spring whereof will be strained in an opposite direction; and also through the connections $28^a$ and 28 the strain will be transmitted to the other two wheels also. It will also be noted that there is a true suspension from all points except point 13 which is a real anchor for the device and this will cause an uneven distribution of weight to be automatically distributed to all of the springs.

It is to be particularly noted that the members 19 and $19^a$ and said bars 23 and $23^a$ are so mounted that when a strain is placed on the respective spring, the movement of the spring changes the leverage, so that the rocking of the member 19 or $19^a$ and 23 and $23^a$ becomes more difficult the farther the member or bar is moved from normal. This is arranged in this manner so that there may not be a too great transfer of weight, and yet a gradual and complete absorption of shock. In like manner the angular arrangement of members 28 and $28^a$ contributes to the same end.

In order to prevent the imposition of undue strain on the forward springs as when one of the forward wheels goes into a rut, I prefer to connect the forward springs to the forward axle in the manner best shown in Figure 3. Each of the connections alluded to comprises bearing members 36 connected to the forward axle, and a member 37 shackled or otherwise connected to one forward spring and provided with trunnions 38 journaled in the bearing members. It will thus be apparent that the forward springs and the forward axle each are capable of limited movements relatively to the other, for the purpose indicated.

In order to prevent undue sidewise swaying of the car as in turning corners, I provide the longitudinal, side, springs 35' interposed between and connected to the links 22 and links 22ª.

The construction herein illustrated and described has been reduced to actual practice, and in practical use has demonstrated its efficiency for the purposes indicated, and this without interfering in any measure with the normal operation of the automobile.

Having described my invention, what I claim and desire to secure by Letters-Patent, is:—

1. An equalizing organization comprising a chassis frame, springs offset therefrom and connected thereto, pivoted members on the chassis frame connecting said springs thereto, and means connecting said pivoted members together and movably connected to the chassis frame; the springs and the pivoted members being arranged in forward and rear pairs, and the means connecting the pivoted members and movably connected to the chassis frame including spaced cross rods, connections between the same and the pivoted members, and swinging hanger members on the chassis frame and connected to said cross rods.

2. An equalizing organization comprising a chassis frame, springs offset therefrom and connected thereto, pivoted members on the chassis frame connecting said springs thereto, and means connecting said pivoted members together and movably connected to the chassis frame; the springs and the pivoted members being arranged in forward and rear pairs, and the means connecting the pivoted members and movably connected to the chassis frame including spaced cross rods, connections between the same and the pivoted members, swinging hanger members on the chassis frame and connected to the said cross rods at points intermediate of the ends thereof, and retractile side springs interposed between the end portions of the cross rods.

3. An equalizing organization comprising a chassis frame, springs offset therefrom and connected thereto, pivoted members on the chassis frame connecting said springs thereto, and means connecting said pivoted members together and movably connected to the chassis frame; the springs and the pivoted members being arranged in forward and rear pairs, and the means connecting the pivoted members and movably connected to the chassis frame including spaced cross rods, connections between the same and the pivoted members, swinging hanger members on the chassis frame and connected to the said cross rods at points intermediate of the ends thereof, retractile side springs interposed between the end portions of the cross rods, and a rod connection interposed between the lower end of the said swinging hanger members.

In testimony whereof I affix my signature.

JOSEPH A. SCHANNO.